US012651464B2

(12) United States Patent
Ravlyuk

(10) Patent No.: US 12,651,464 B2
(45) Date of Patent: Jun. 9, 2026

(54) PORTABLE PERSONAL ASSISTANT SYSTEM AND METHOD FOR SENSORY DATA STORAGE, MANIPULATION, AND EXCHANGE

(71) Applicant: Olha Ravlyuk, Brooklyn, NY (US)

(72) Inventor: Olha Ravlyuk, Brooklyn, NY (US)

( * ) Notice: Subject to any disclaimer, the term of this patent is extended or adjusted under 35 U.S.C. 154(b) by 0 days.

(21) Appl. No.: 19/042,596

(22) Filed: Jan. 31, 2025

(65) Prior Publication Data

US 2025/0252754 A1 Aug. 7, 2025

Related U.S. Application Data

(60) Provisional application No. 63/548,994, filed on Feb. 2, 2024.

(51) Int. Cl.
*G06V 20/58* (2022.01)
*G06F 3/01* (2006.01)

(52) U.S. Cl.
CPC .............. *G06V 20/58* (2022.01); *G06F 3/015* (2013.01); *G06F 3/016* (2013.01)

(58) Field of Classification Search
CPC .......... G06V 20/58; G06F 3/015; G06F 3/016
See application file for complete search history.

(56) References Cited

U.S. PATENT DOCUMENTS 12,147,521 B2 * 11/2024 Wexler .................... G06F 21/32
2013/0063550 A1 * 3/2013 Ritchey ................ A61B 5/7246
345/207

2016/0127641 A1 * 5/2016 Gove ................... G03B 15/006
348/143
2019/0025773 A1 * 1/2019 Yang ......................... G06T 5/77
(Continued)

FOREIGN PATENT DOCUMENTS

WO WO-2021053605 A1 * 3/2021 ............. G16H 40/63

OTHER PUBLICATIONS

Jernigan, Joleen, "Humane's latest AI is a wearable personal assistant", web article in The American Genius, May 1, 2023, https://theamericangenius.com/humane-ai-wearable-personal-assistant/.

*Primary Examiner* — Dramos Kalapodas
(74) *Attorney, Agent, or Firm* — Jacob M. Ward; Ward Law Office LLC

(57) ABSTRACT

Ways to facilitate multimodal interaction and communication for users are provided. A personal assistant system for a user includes a portable device equipped with a three-dimensional (3D) camera for generating images of 3D space and a propulsion system for self-propulsion. The personal assistant system also comprises a speaker, a microphone, and a control system interfacing with these components. The control system features a navigation module for controlling the propulsion system, an audio recognition module for converting audio from the microphone, and an image recognition module for processing images from the 3D camera. A processor transforms these formats into a processor-output, while an artificial intelligence (AI) module analyzes the formats to identify actionable commands and convert them into processor-output. An output generating module then converts the processor-output into a user-friendly output. Use of the personal assistant system enhances user convenience, accessibility, and engagement in educational, professional, and personal pursuits.

19 Claims, 16 Drawing Sheets

(56)                References Cited

U.S. PATENT DOCUMENTS

| 2019/0236976 | A1* | 8/2019 | Horban | ................. | H04R 1/406 |
| 2021/0166712 | A1* | 6/2021 | Goldstein | ............... | G06F 3/167 |
| 2022/0383864 | A1* | 12/2022 | Gruber | ................... | G06F 3/167 |
| 2022/0405537 | A1* | 12/2022 | Yang | ...................... | G06N 3/094 |
| 2023/0308605 | A1* | 9/2023 | Ritchey | ............. | H04N 21/4305 |

* cited by examiner

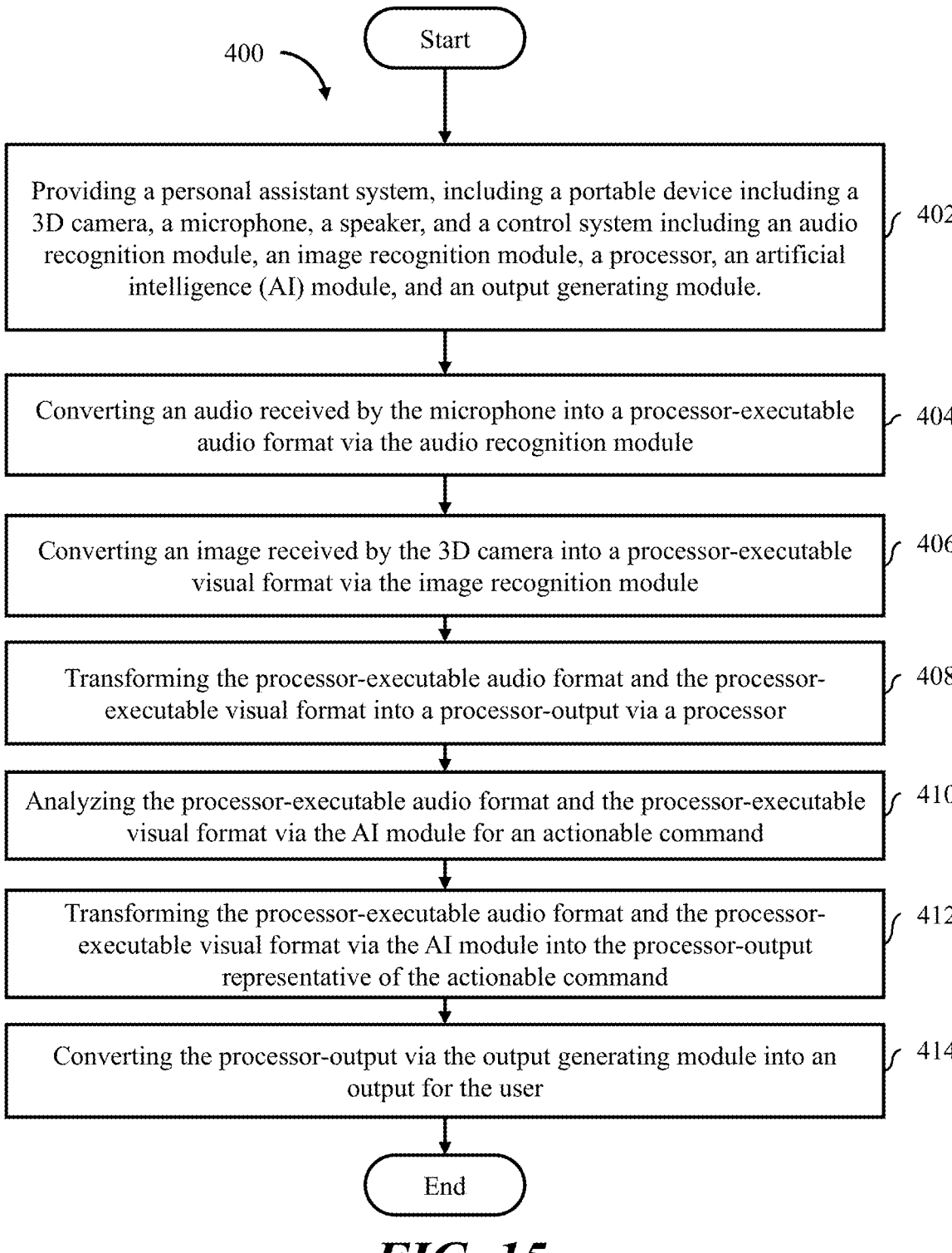

400

Start

Providing a personal assistant system, including a portable device including a 3D camera, a microphone, a speaker, and a control system including an audio recognition module, an image recognition module, a processor, an artificial intelligence (AI) module, and an output generating module.          402

Converting an audio received by the microphone into a processor-executable audio format via the audio recognition module          404

Converting an image received by the 3D camera into a processor-executable visual format via the image recognition module          406

Transforming the processor-executable audio format and the processor-executable visual format into a processor-output via a processor          408

Analyzing the processor-executable audio format and the processor-executable visual format via the AI module for an actionable command          410

Transforming the processor-executable audio format and the processor-executable visual format via the AI module into the processor-output representative of the actionable command          412

Converting the processor-output via the output generating module into an output for the user          414

End

*FIG. 15*

PORTABLE PERSONAL ASSISTANT SYSTEM AND METHOD FOR SENSORY DATA STORAGE, MANIPULATION, AND EXCHANGE

CROSS-REFERENCE TO RELATED APPLICATIONS

This application claims the benefit of U.S. Provisional Application No. 63/548,994, filed on Feb. 2, 2024. The entire disclosure of the above application is incorporated herein by reference.

FIELD

The present technology relates to interactive electronic devices with advanced sensory integration and artificial intelligence capabilities for personal life management and assistive technology applications.

INTRODUCTION

This section provides background information related to the present disclosure which is not necessarily prior art.

Individuals with sensory impairments may encounter challenges negotiating certain environments and when interacting with various hardware and software technologies. These challenges may include difficulties in communication, accessing entertainment, and safely navigating environments. Such challenges may be heightened for users engaged in multitasking activities, such as operating a vehicle while using a communication device. A personal assistant device may facilitate a user in negotiating a particular environment; however, the personal assistant device may be limited in that it fails to provide hands-free operation or comprehensive support for safe and effective multitasking. The personal assistant device may also fall short in addressing the diverse needs of users with hearing, speech, vision, or other medical conditions, leading to a gap in accessibility and usability.

The personal assistant device may be configured with functionalities aimed at improving user interaction with the device. However, the device may lack certain features for use with those with specific sensory needs, including ways to assist a user with one or more sensory impairments in real-time decision-making and task management tailored to the user's sensory capabilities and environmental contexts. The absence of an intuitive and inclusive interface in personal assistant device may limit the independence and overall quality of life for a user with sensory impairment. Certain personal assistant systems focus on stationary devices that rely on voice recognition and basic audio output to interact with the user. Such devices include smart speakers and virtual assistants integrated into smartphones and other devices that may utilize microphones and speakers to process and respond to user commands for certain tasks. Such as stationary devices, however, are limited in usefulness in helping a user move through an negotiate an unfamiliar environment, where such devices lack spatial awareness, which restricts their ability to interact with the physical environment or provide contextually relevant assistance based on the user's surroundings.

To enhance user interaction, a personal assistant device may incorporate basic camera functionalities to capture two-dimensional images or video. A device of this type may perform rudimentary image recognition tasks, such as identifying objects or faces, but it may lack the capability to perceive depth or navigate through three-dimensional space. As a result, the ability to provide comprehensive assistance in dynamic environments may be limited, and the personal assistant device may be unable to autonomously move or adjust its position to better serve the user.

Efforts to integrate mobility into a personal assistant device may include a robotic platform equipped with wheels or tracks. A mobile personal assistant device may navigate through an environment but may rely on a pre-programmed path or require manual control. Additionally, the interaction capabilities of the mobile personal assistant device may be confined to basic obstacle avoidance and navigation tasks, without sophisticated audio and visual processing needed to understand and execute complex user commands. There are certain challenges to address in providing a mobile personal assistant device to aid a user with one or more sensory impairments in everyday tasks and activities.

Accordingly, there is a need for improved personal assistant technologies, which can bridge accessibility gaps and offer improved support for individuals with varying sensory abilities, as well as enhance life management capabilities for all users.

SUMMARY

In concordance with the present disclosure, a personal assistant technology that can bridge accessibility gaps and offer improved support for individuals with varying sensory abilities, as well as enhance life management capabilities for all users, has surprisingly been discovered. The present technology includes articles of manufacture, systems, and processes that relate to enhancing the sensory capabilities of a user. More specifically, the present technology pertains to an innovative approach to individual life management in real-time through advanced sensory integration, interaction, and multiple senses data exchange, thereby enhancing the user's communication experience.

In certain embodiments, a personal assistant system for a user is provided. The personal assistant system may include a portable device. The personal assistant system may include a three-dimensional (3D) camera. The 3D camera may be configured to generate an image representative of three-dimensional space. The 3D camera may include a time-of-flight camera, a range camera, a stereo camera, or a structured light camera. The personal assistant system may include a propulsion system. The propulsion system may be configured to self-propel the portable device. The propulsion system may include a propeller configured to elevate the portable device. The personal assistant system may include a speaker. The personal assistant system may also include a microphone. The personal assistant system may include a control system. The control system may be in communication with the portable device, the speaker, and the microphone. The control system may include a navigation module. The navigation module may be configured to control the propulsion system. The control system may include an audio recognition module. The audio recognition module may be configured to convert audio received by the microphone into a processor-executable audio format. The control system may also include an image recognition module. The image recognition module may be configured to convert the image received by the 3D camera into a processor-executable visual format. The control system may also include a processor. The process may be configured to transform the processor-executable audio format and the processor-executable visual format into a processor-output. The control system may also include an artificial intelligence (AI) module. The AI module may be configured to operate with the processor. The AI module may also be configured to analyze the processor-executable audio format and the processor-executable visual format for an actionable command. The AI module may be further configured to transform the processor-executable audio format and the processor-executable visual format into the processor-output representative of the actionable command. The control system may also include an output generating module. The output generation module may be configured to convert the processor-output into an output for the user.

In certain embodiments, the personal assistant system may be in communication with a user-device. The user-device may include a smartphone, a remote control, a desktop computer, a touch screen, or a tablet. The personal assistant system may also be in communication with an assistive device for all-senses data exchange. The assistive device may include a cochlear implant, a brain-speech array, a speech generator, an eye tracker, or an electronic mobility aid. The personal assistant system may also be configured to assist with an activity of the user. The activity may include a calendar invite, an instance of a global positioning system (GPS) location, an instance of content recording, a media content, a language translation, or an instance of a biometric analysis.

In certain embodiments, the portable device may further include a sensor. The sensor may be configured to receive an input from an environment. The input may include a force input, an optical input, an electromagnetic input, an ultraviolet input, an atmospheric temperature input, and/or an atmospheric pressure input. The sensor may include an accelerometer, a gyroscope, a magnetometer, and/or a barometer. The portable device may also include a screen. The screen may be disposed on the portable device. The screen may be in communication with the microphone, speaker, 3D camera, and control system. The screen may be configured to protrude outward from the portable device when in use. Conversely, the screen may be configured to retract back toward the portable device when not in use.

In certain embodiments, the personal assistant system may include an earpiece. The earpiece may be in communication with the portable device, the speaker, and the microphone. The earpiece may include a driver, an earpiece microphone, a noise-cancelation module, or a vibration-to-speech module. The earpiece may also include an artificial larynx. The artificial larynx may be configured to extend toward a neck area of the user.

In certain embodiments, the personal assistant system may include a display device. The display device may be configured to generate content. The content may include an image, a 3D image, a video, a 3D video, a holographic image, or a holographic video. The display device may include a piezoelectric sensor. The piezoelectric sensor may be configured to detect braille tactile signals created by the user.

In certain embodiments, the personal assistant system may include a wand. The wand may include a bioelectronic sensor. The bioelectronic sensor may include a taste-biosensor. The bioelectronic sensor may also include an odor-biosensor. The wand may include an ultrasonic transducer. The wand may further include a heartrate monitor.

In certain embodiments, a method of operating a personal assistant system is provided. The method may include a step of providing a personal assistant system including a portable device, the portable device including a 3D camera and a screen, a microphone, a speaker, and a control system. The control system may include an audio recognition module, an image recognition module, a processor, an artificial intelligence (AI) module, and an output generating module. The screen may be configured to generate content including an image, a 3D image, a video, a 3D video, a holographic image, or a holographic video. The method may include a step of converting an audio received by the microphone into a processor-executable audio format via the audio recognition module. The method may include a step of converting an image received by the 3D camera into a processor-executable visual format via the image recognition module. The method may include a step of transforming the processor-executable audio format and the processor-executable visual format into a processor-output via a processor. The method may include a step of analyzing the processor-executable audio format and the processor-executable visual format via the AI module for an actionable command. The method may include a step of transforming the processor-executable audio format and the processor-executable visual format via the AI module into the processor-output representative of the actionable command. The method may further include a step of converting the processor-output via the output generating module into an output for the user. This method allows a user to receive real-time sensory feedback from the personal assistant system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

FIG. 15 is a flowchart illustrating a method of using a personal assistant system, according to another embodiment of the present disclosure.

DETAILED DESCRIPTION

Figure 1:
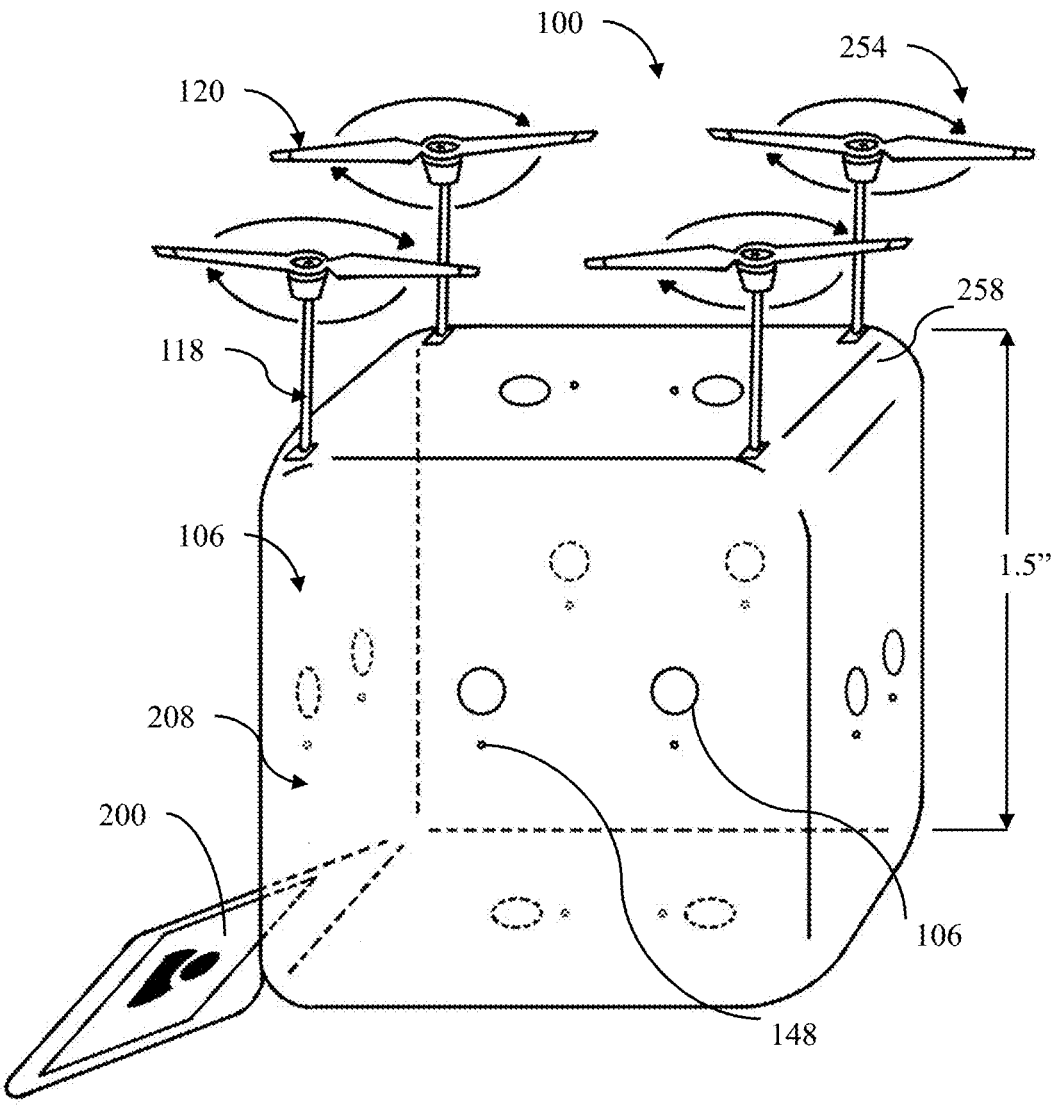
FIG. 1 is a top perspective view of a personal assistant system, according to an embodiment of the present disclosure.

The following description of technology may be merely exemplary in nature of the subject matter, manufacture and use of one or more inventions, and may be not intended to limit the scope, application, or uses of any specific invention claimed in this application or in such other applications as may be filed claiming priority to this application, or patents issuing therefrom. Regarding methods disclosed, the order of the steps presented may be exemplary in nature, and thus, the order of the steps can be different in various embodiments, including where certain steps can be simultaneously performed, unless expressly stated otherwise. "A" and "an" as used herein indicate "at least one" of the item may be present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" may be not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, may be used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D may be not explicitly described as being excluded herein.

Disclosures of ranges are, unless specified otherwise, inclusive of endpoints and include all distinct values and further divided ranges within the entire range. Thus, for example, a range of "from A to B" or "from about A to about B" may be inclusive of A and of B. Disclosure of values and ranges of values for specific parameters (such as amounts, weight percentages, etc.) are not exclusive of other values and ranges of values useful herein. It may be envisioned that two or more specific exemplified values for a given parameter may define endpoints for a range of values that may be claimed for the parameter. For example, if Parameter X may be exemplified herein to have value A and also exemplified to have value Z, it may be envisioned that Parameter X may have a range of values from about A to about Z. Similarly, it may be envisioned that disclosure of two or more ranges of values for a parameter (whether such ranges are nested, overlapping or distinct) subsume all possible combination of ranges for the value that might be claimed using endpoints of the disclosed ranges. For example, if Parameter X may be exemplified herein to have values in the range of 1-10, or 2-9, or 3-8, it may be also envisioned that Parameter X may have other ranges of values including 1-9, 1-8, 1-3, 1-2, 2-10, 2-8, 2-3, 3-10, 3-9, and so on.

When an element or layer may be referred to as being "on," "engaged to," "connected to," or "coupled to" another element or layer, it may be directly on, engaged, connected or coupled to the other element or layer, or intervening elements or layers may be present. In contrast, when an element may be referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures may be turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology includes articles of manufacture, systems, and processes that relate to the field of interactive electronic devices with enhanced sensory capabilities. Innovative approaches to life management are provided in real-time through advanced sensory integration, interaction, and all-senses data exchange, thereby enhancing a user's communication experience and ability to negotiate various environments. The present technology includes to a personal assistant system and a method of using the personal assistant system, aspects of which are shown generally in accompanying FIGS. 1-16. With reference to FIGS. 1 through 14, aspects of a personal assistant system 100 for a user 102 are depicted. Aspects of a method 400 for operating a personal assistant system 100 are shown in FIG. 15.

As shown in FIGS. 1 through 14, a personal assistant system 100 for a user 102 is provided. The personal assistant system 100 may include a portable device 106. The personal assistant system 100 may include a three-dimensional (3D) camera 108. The 3D camera 108 may be configured to generate an image 290 representative of three-dimensional space. The 3D camera 108 may include a time-of-flight camera 110, a range camera 112, a stereo camera 114, and/or a structured light camera 116. The 3D camera 108 may be configured to create high resolution images 290 and video 256 while in motion, while underwater, at night or in dark environments, and may utilize an inverted binocular effect. The personal assistant system 100 may include a propulsion system 118. The propulsion system 118 may be configured to self-propel the portable device 106. The propulsion system 118 may include a propeller 120 configured to elevate the portable device 106. The personal assistant system 100 may include a speaker 122. The personal assistant system 100 may also include a microphone 124. The personal assistant system 100 may include a control system 126. The control system 126 may be in communication with the portable device 106, the speaker 122, and the microphone 124. The control system 126 may include a navigation module 128. The navigation module 128 may be configured to control the propulsion system 118. The control system 126 may include an audio recognition module 130. The audio recognition module 130 may be configured to convert audio received by the microphone 124 into a processor-executable audio format 132. The control system 126 may also include an image recognition module 134. The image recognition module 134 may be configured to convert an image received by the 3D camera 108 into a processor-executable visual format 136. The control system 126 may also include a processor 138. The processor 138 may be configured to transform the processor-executable audio format 132 and the processor-executable visual format 136 into a processor-output 140. The control system 126 may also include an artificial intelligence (AI) module 142. The AI module 142 may be configured to operate with the processor 138. The AI module 142 may also be configured to analyze the processor-executable audio format 132 and the processor-executable visual format 136 for an actionable command 144. The AI module 142 may be further configured to transform the processor-executable audio format 132 and the processor-executable visual format 136 into the processor-output 140 representative of the actionable command 144. The control system 126 may also include an output generating module 146. The output generating module 146 may be configured to convert the processor-output 140 into an output 344 for the user 102. The control system 126 may also include a sensor 148. The sensor 148 may include an accelerometer 150, a gyroscope 152, a magnetometer 154, or a barometer 156.

The personal assistant system 100 may be in communication with a user-device 158. The user-device 158 may include a smartphone 160, a remote control 162, a desktop computer 164, a touch screen 166, or a tablet 168. The personal assistant system 100 may also be in communication with an assistive device 170 for all-senses data exchange 104. The assistive device 170 may include a cochlear implant 172, a brain-speech array 174, a speech generator 176, an eye tracker 178, or an electronic mobility aid 180. It should be appreciated that the communication between the personal assistant system 100 and the assistive device 170 may not only enhance communication for user 102 with speech or hearing impairments but also support the user 102 in comprehension of their surroundings. The personal assistant system 100 may also be configured to assist with an activity of the user 102. The activity may include a calendar invite 182, an instance of a global positioning system (GPS) location 184, an instance of content recording 186, a media content 188, a language translation 190, or an instance of a biometric analysis 192. The audio recognition module 130 may include an audio processing unit 194. The image recognition module 134 may also include an image processing unit 196. The processor 138 may include a central processing unit (CPU) 198.

Figures 2, 3:
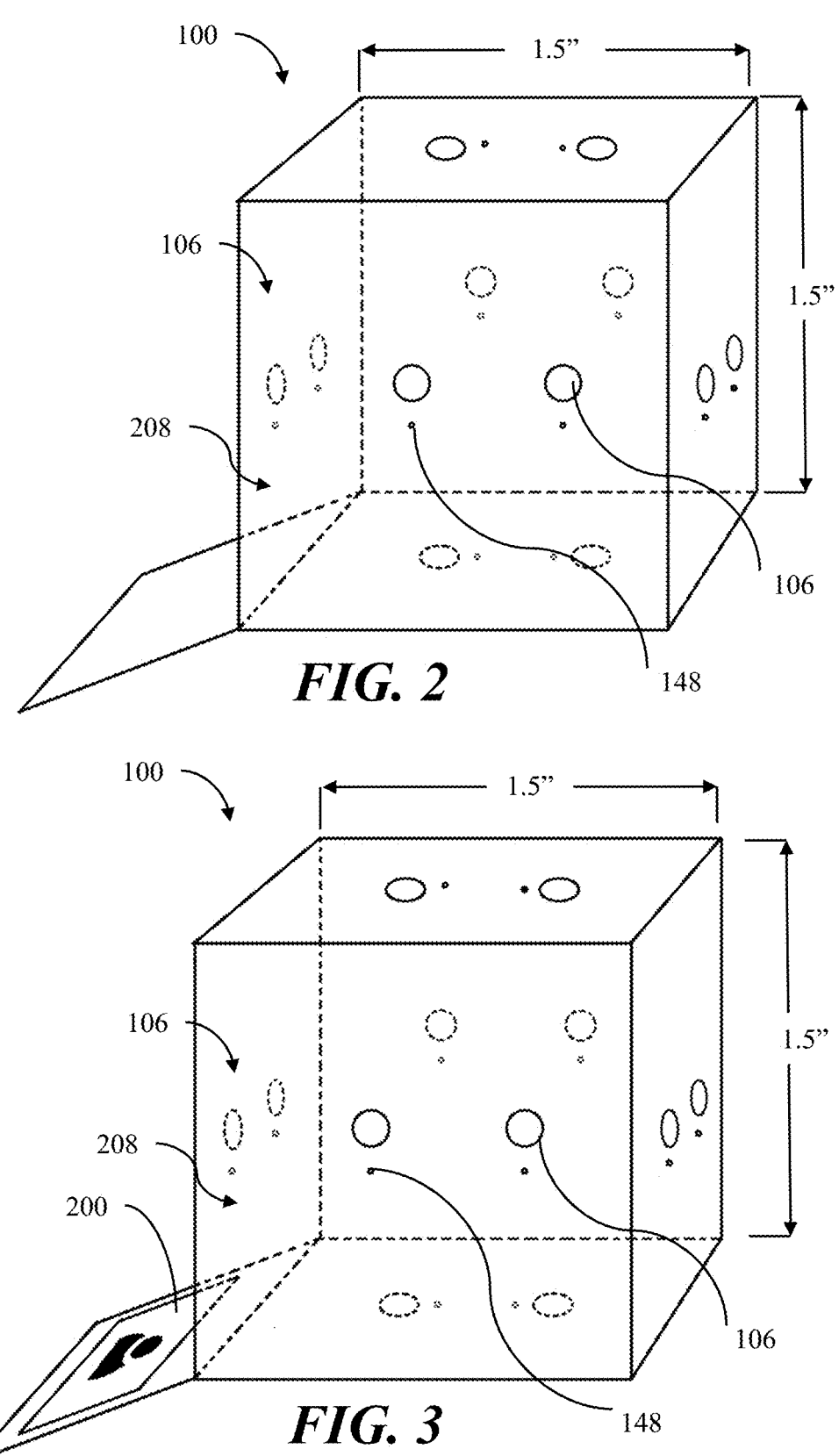
FIG. 2 is a top perspective view of a personal assistant system, according to an embodiment of the present disclosure.
FIG. 3 is a top perspective view of a personal assistant system, according to an embodiment of the present disclosure.
Figure 4:
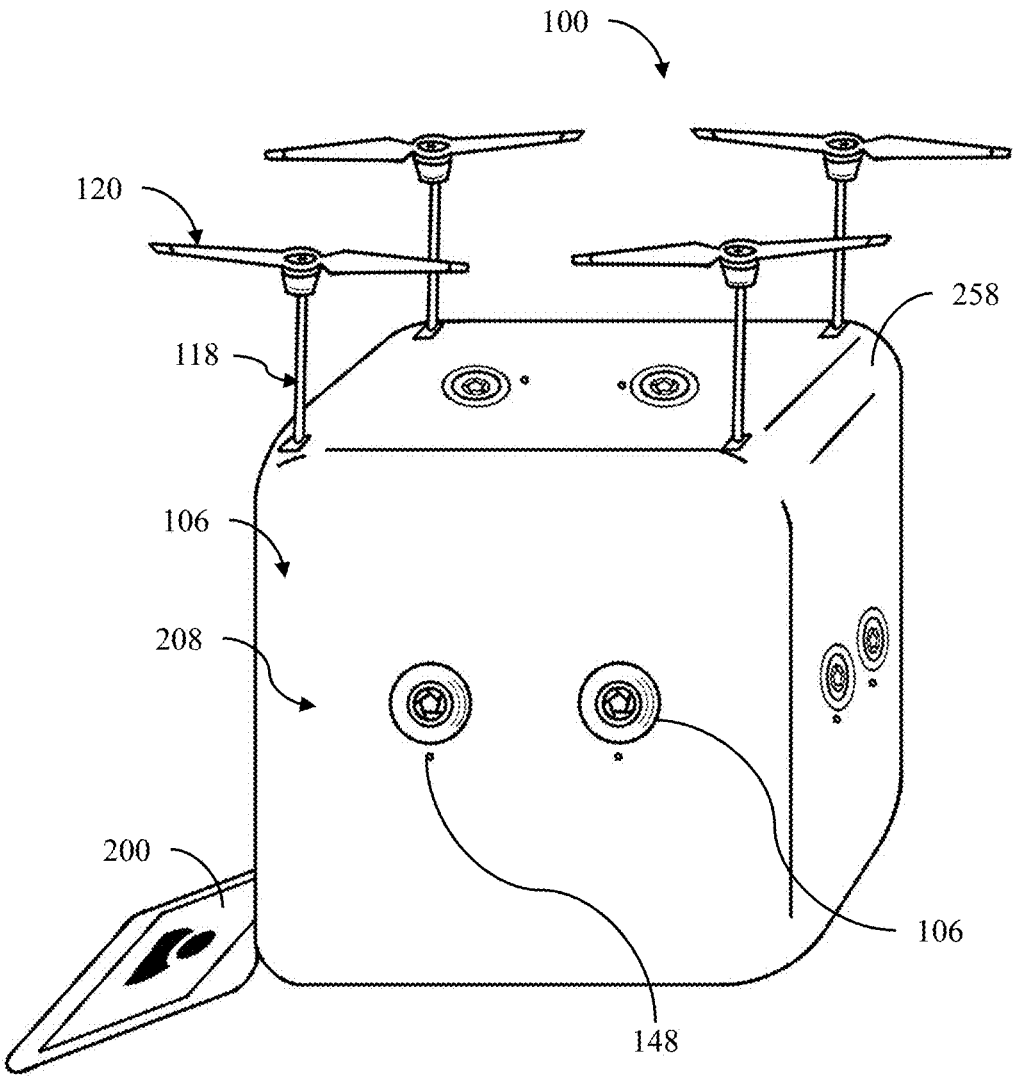
FIG. 4 is a top perspective view of a personal assistant system, according to an embodiment of the present disclosure.

The portable device 106 may include the following aspects. As shown in FIGS. 1 through 5, 11A and 11B, the portable device 106 may be compact and lightweight to provide easy transportation. For example, as shown in FIGS. 1 through 3, the portable device may be 1.5 inches in height, and 1.5 inches in width. The portable device 106 may be configured to be waterproof, able to withstand chemical damage, shock absorbent, and able to withstand extreme temperatures. For example, the portable device 106 may utilize black-box technology to lock data and information at times of emergency for future retrieval and examination. The portable device 106 may include a sensor 148. The portable device 106 may also include a screen 200. The portable device 106 may also assist with an activity including a calendar invite 182, an instance of a GPS location 184, an instance of content recording 186, a media content 188, a language translation 190, or an instance of a biometric analysis 192. The portable device 106 may also provide other social interactions, for example, the portable device 106 may play music and games 202, provide weather information 204, or translation services 206 based on user 102 input from the user-device 158 or directly based on user 102 input from the portable device 106. For example, the portable device 106 may also provide specific functions when close to the user 102, such as enhanced connectivity to implants or impaired organs. In another example, the portable device 106 may further provide alerts to the user 102 by analyzing the surrounding environment for potential dangers or obstacles. It should be appreciated that the portable device 106 may be operated in a manner that prioritizes privacy during conversations or entertainment sessions. Advantageously, the portable device 106 may assist the user 102 in day-to-day activities. The portable device 106 may include six sides 208. More specifically, the portable device 106 may include a first side 208, a second side 208, a third side 208, a fourth side 208, a fifth side 208, and a sixth side 208. Each of the sides 208 may collectively make up and define the portable device 106, creating a cube shape 210. The portable device 106 may be equipped with the 3D camera 108 on each side 208. Advantageously, the 3D camera 108 on each side 208 may enable the generation of a 3D view and video recording capabilities 210 and to create a 360° view while in in free-fly mode 254. The 3D camera 108 may operate simultaneously or alternately, based on the input of the user 102. Additionally, the portable device 106 may automatically adjust the focus of the 3D camera 108 in response to voice commands or manual remote adjustments by the user 102. The sensor 148 may be disposed on each side 208 of the portable device 106. The sensor 148 may be configured to detect environmental changes around the vicinity of the user 102. The sensor 148 may also be in communication with the user-device 158 to notify the user 102 of any changes to the environment. Advantageously, the sensor 148 allows the portable device 106 to be aware of the surrounding environment, for example, changes in weather such as temperature and humidity. Further, the sensor 148 allows the portable device 106 to utilize an all-senses data exchange 104. It should be appreciated that the phrase "all-senses data exchange 104," as referred herein, may be used to describe the capabilities of the portable device 106 to detect the surrounding environment of the portable device 106 and further to transmit and communicate the detections to the user-device 158, and the microphone 124. For example, the all-senses data exchange 104 may refer to the capability of the sensor 148 to detect the sound and the movement of a car approaching the user 102 from a certain direction, which may transmit the detection to the portable device 106 and allow the portable device 106 to communicate to the user 102 that a car may be approaching the user 102. It should also be appreciated that the all-senses data exchange 104 capability may make use of the sensor 148, or a combination of the sensor 148 to facilitate the all-senses data exchange 104 capability of the personal assistant system 100. The portable device 106 may also be physically coupled to the user 102. It should be appreciated that the portable device 106 may be coupled to the user 102 via various ways, for example, fasteners including Velcro, a clip, a clamp, a lanyard, or means of attachment. The portable device 106 may be disposed on various areas of the user's 102 body including the shoulder, head, torso, or on apparel worn by the user 102.

As shown in FIG. 10A through 11B, the portable device 106 may also include a camera lens 212 for adjusting the focus of the 3D camera 108. For example, the camera lens 212 may be configured to refocus the 3D camera 108 and may also extend beyond the portable device 106 for focal points such as around corners. The portable device 106 may also include a pollutant mesh 214. For example, the pollutant mesh 214 may provide protection to the portable device 106 from smoke and other particulates in the air. The portable device 106 may also include a noise-cancelation module 216. The portable device 106 may include an ultraviolet (UV) filter 218. The portable device 106 may also include a remote sensor 220. The portable device 106 may also include an infrared light-emitting diode (IR LED) light 222 and an IR transmitter 224. The portable device 106 may also include an antenna 226. The portable device 106 may also include a propeller activator 228. The portable device 106 may also include a light sensor 230. The portable device 106 may also include a main board 232. The main board 232 may include a barometer 156. The main board 232 may include an image processing unit 196. The main board 232 may include a memory card 234. The main board 232 may include Bluetooth® 236 and wireless capabilities 238. The main board 232 may include a magnetometer 154. The main board 232 may include a gyroscope 152. The various sensors 148 of the portable device 106 may be in communication with the control system 126 to facilitate the all-senses data exchange 104 between the portable device 106 and the user-device 158, and the microphone 124. The portable device 106 may also include a sensor unit 240, for example, a resistive sensor unit. The sensor 148 may be configured to receive an input 242 from an environment. For example, the input 242 may include an ultraviolet input, 244, an atmospheric temperature input 246, an electro-magnetic input 248, or an atmospheric pressure input 250.

Figure 5:
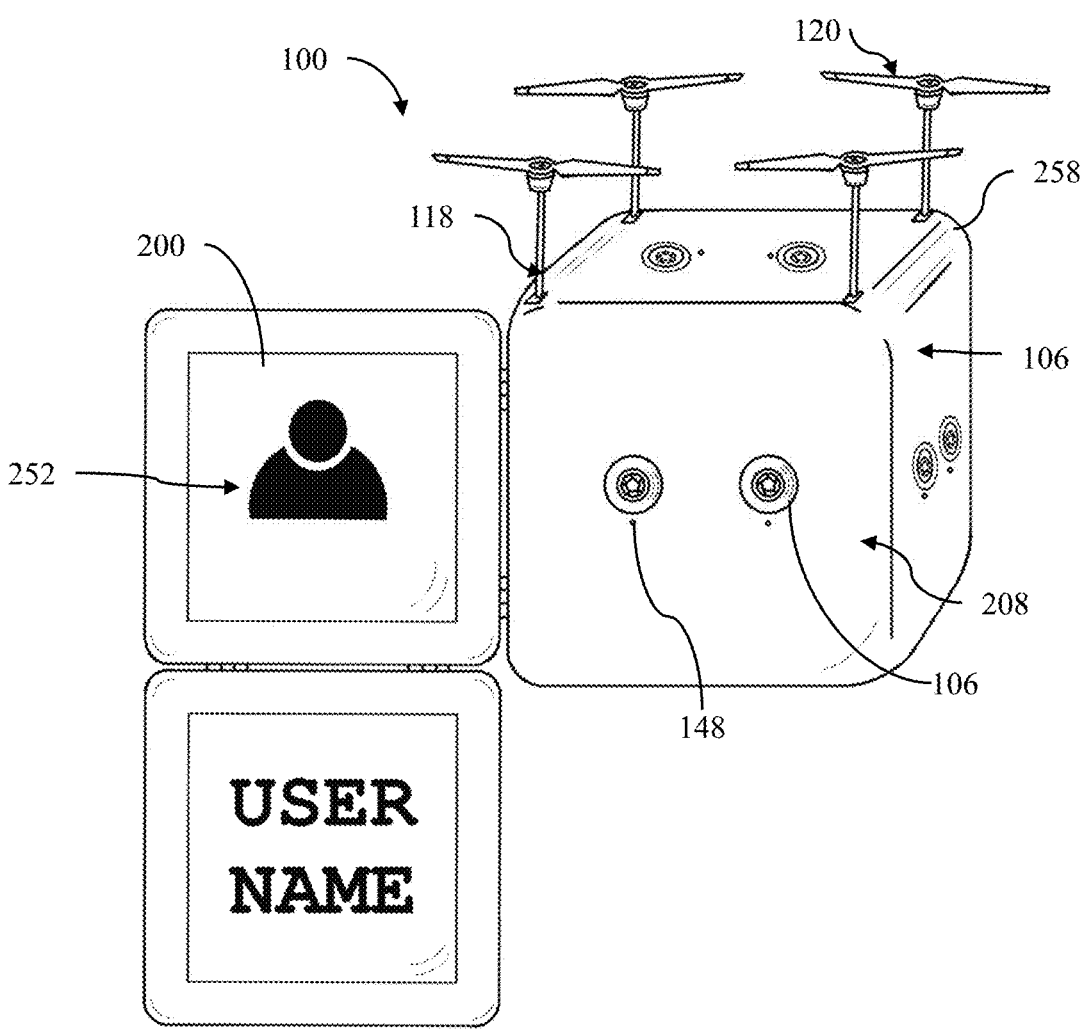
FIG. 5 is a top perspective view of a personal assistant system, according to an embodiment of the present disclosure.
Figure 6:
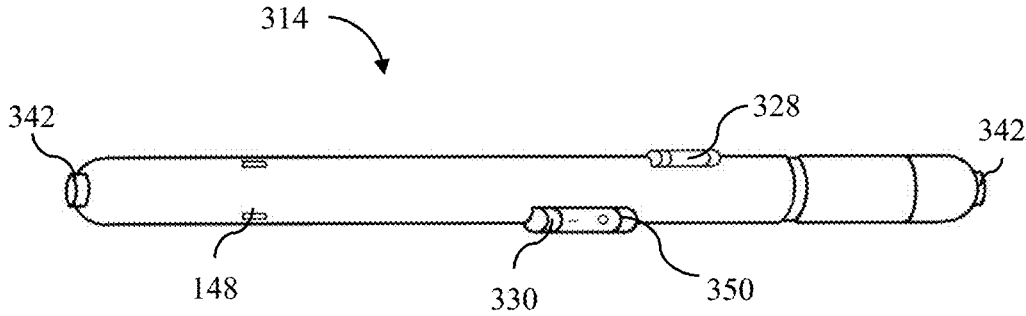
FIG. 6 is a perspective view of a wand of a personal assistant system, according to an embodiment of the present disclosure.
Figure 7:
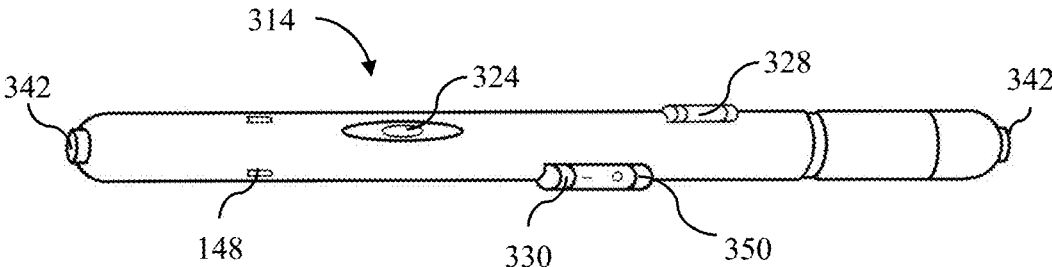
FIG. 7 is a perspective view of a wand of a personal assistant system, according to an embodiment of the present disclosure.
Figure 8:
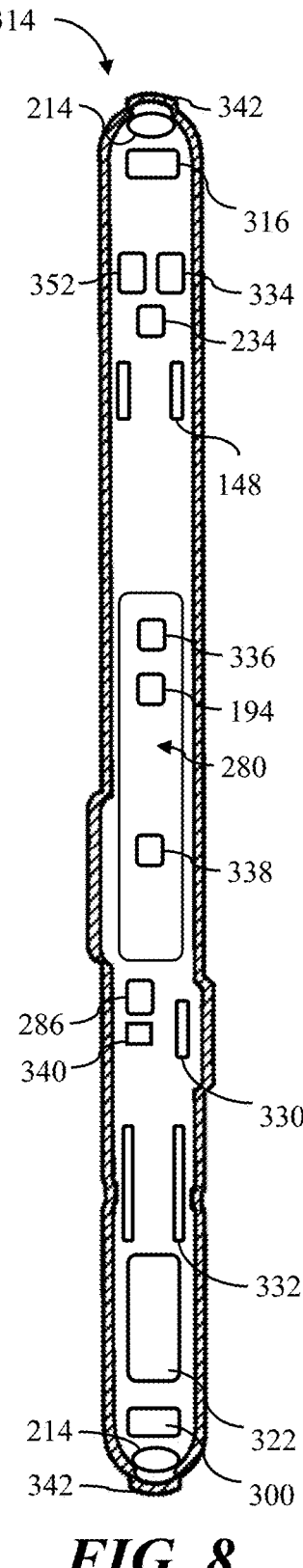
FIG. 8 is a cross-sectional view of a wand of a personal assistant system, according to an embodiment of the present disclosure.

As shown in FIGS. 1, 3 through 5, 10A, and 11B, the screen 200 may include the following aspects. The screen 200 may be disposed on the portable device 106. The screen 200 may be in communication with the microphone 124, speaker 122, 3D camera 108, and control system 126. The screen 200 may be configured to protrude outward from the portable device 106 when in use. Conversely, the screen 200 may be configured to retract back toward the portable device 106 when not in use. The screen 200 may include a foldable screen 200 configured to fold outward from the portable device 106. The foldable screen 200 may also be configured to fold outward multiple times to provide multiple screen 200 sections, as shown in FIG. 5. For example, the screen 200 may be configured to display messages or other visual media to the user 102. The screen 200 may include an interlocutor 252 that may display a person who is attending an audio or video call with the user 102. For example, the screen 200 may display a quick view of an interlocutor 252 during a video call when the portable device 106 enters a free-fly mode 254. The foldable screen 200 may also allow the user 102 to watch media, such as a video 256.

As shown in FIGS. 1 through 5, the propeller 120 may include the following aspects. The propeller 120 may be configured to maneuver the portable device 106 in the vicinity of the user 102. More specifically, the propeller 120 may include a first propeller 120, a second propeller 120, a third propeller 120, and a fourth propeller 120. Each of the propellers 120 may be disposed on each of a top corner 258 of the portable device 106. The propellers 120 may retract back into the portable device 106 when not in use and may extend outwardly from the portable device 106 when in use to allow the portable device 106 to maneuver. The propellers 120 may also enter a free-fly mode 254, allowing the portable device 106 to hover and navigate independently near the user 102. This free-fly mode 254 may be activated based on user 102 preferences or environmental restrictions detected by the portable device 106. As a non-limiting example, the portable device 106 may detect certain environmental restrictions and automatically engage the propellers 120 to allow the portable device 106 to enter the free-fly mode 254. In another example, the propellers 120 may be further configured to maintain stability in unstable weather conditions or during changes in speed while moving.

Figure 9:
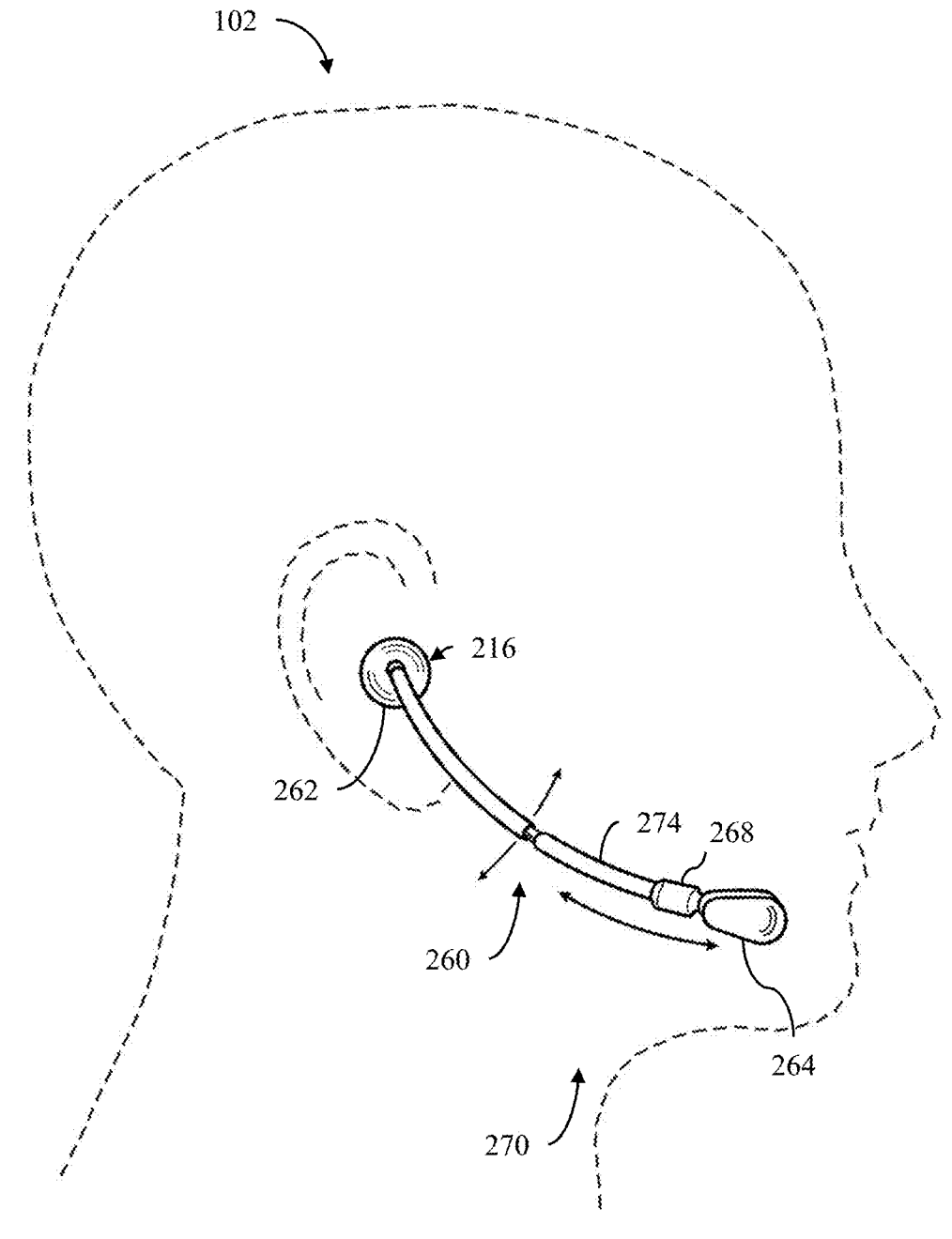
FIG. 9 is a perspective view of an earpiece of a personal assistant system as worn by a user, according to an embodiment of the present disclosure.
Figure 10A:
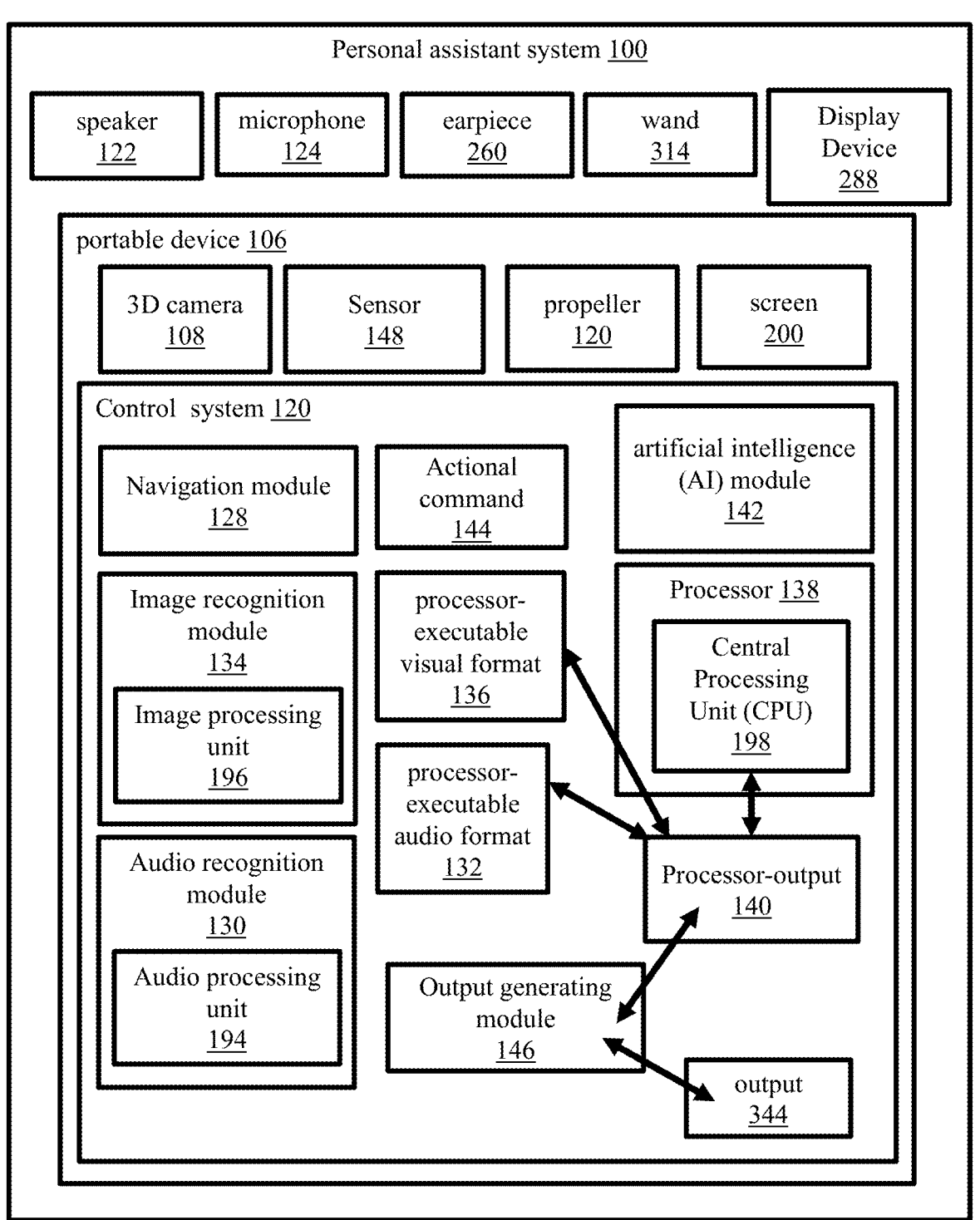
FIG. 10A through 10C are block diagrams illustrating components of a personal assistant system, according to an embodiment of the present disclosure.
Figure 10B:
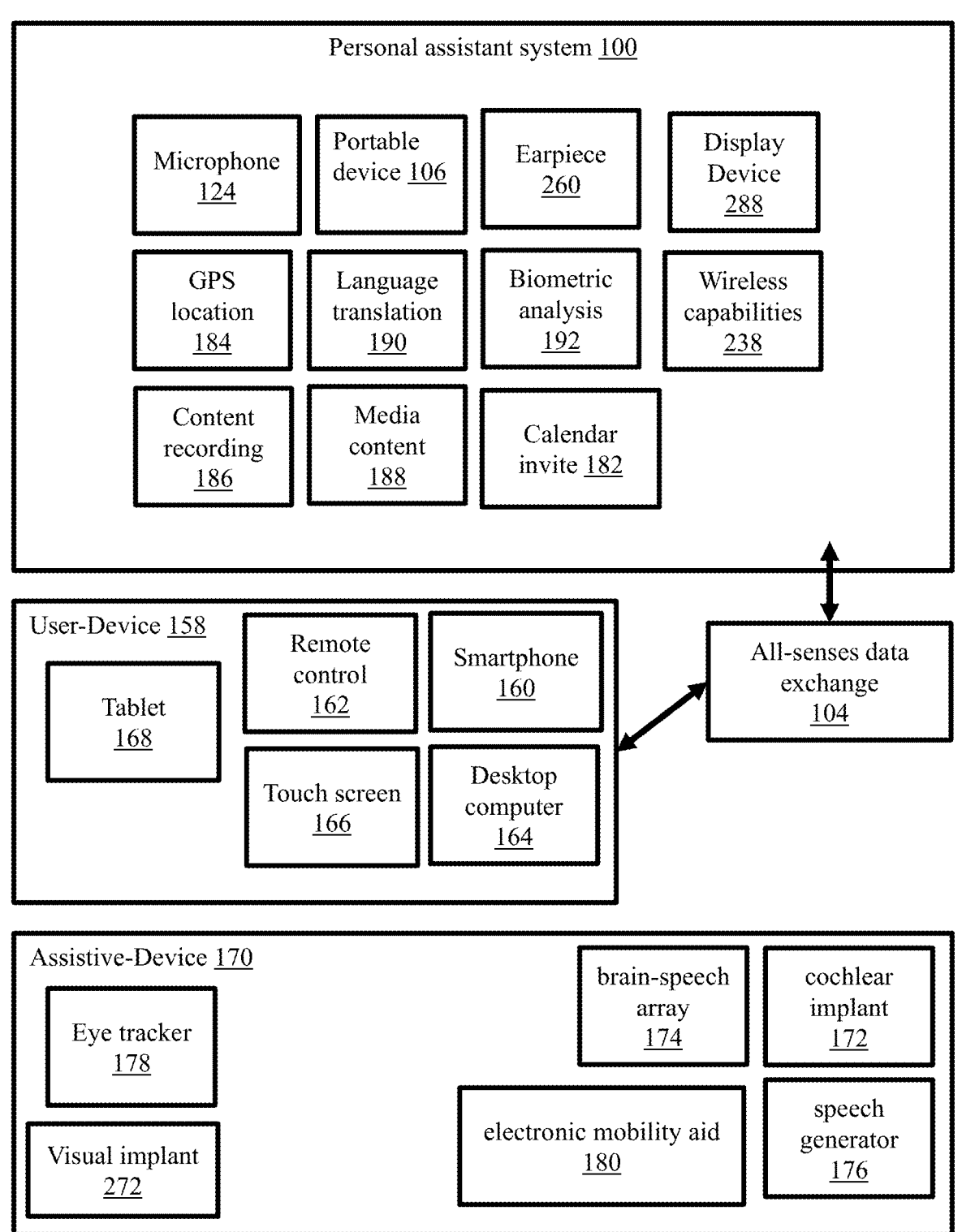
Figure 10C:
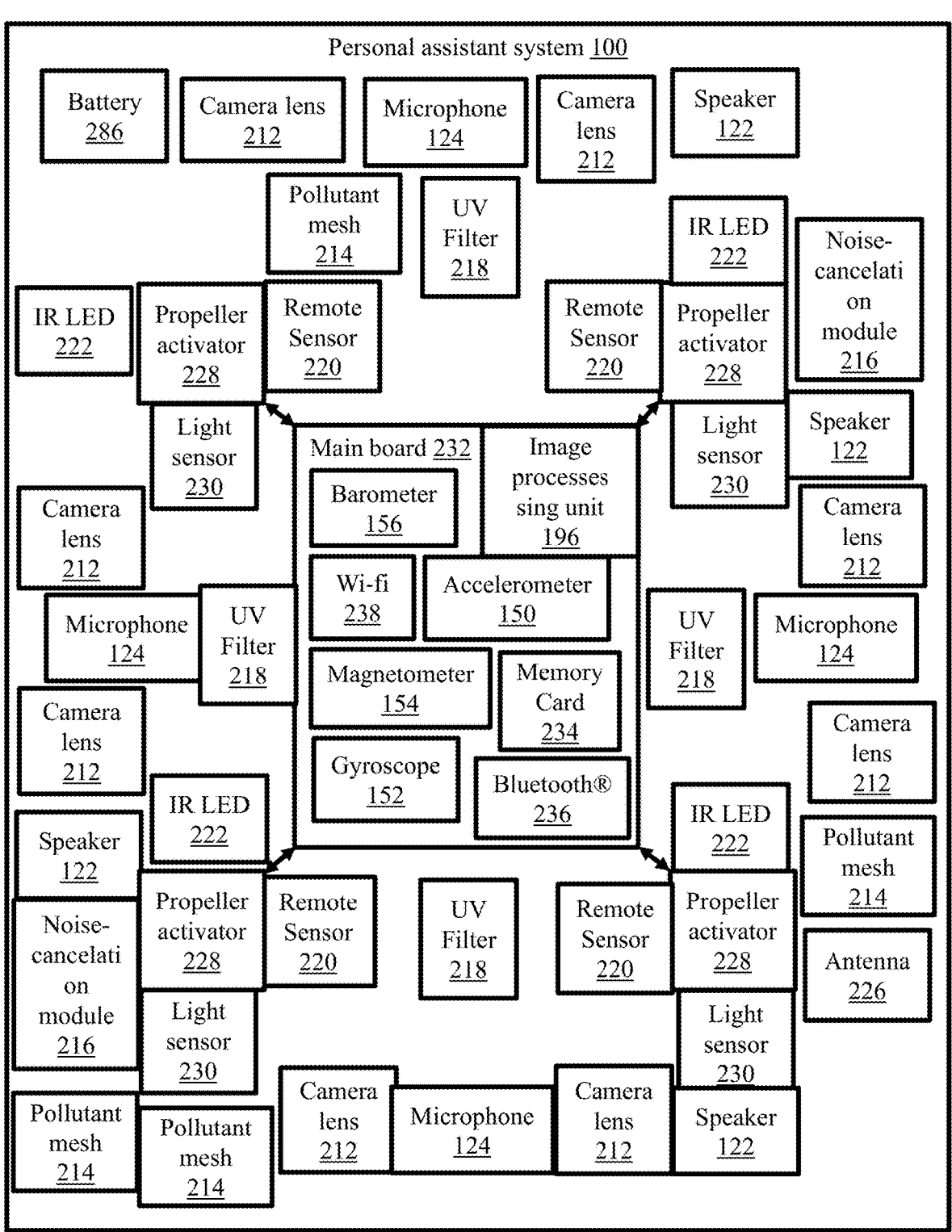
Figure 11A:
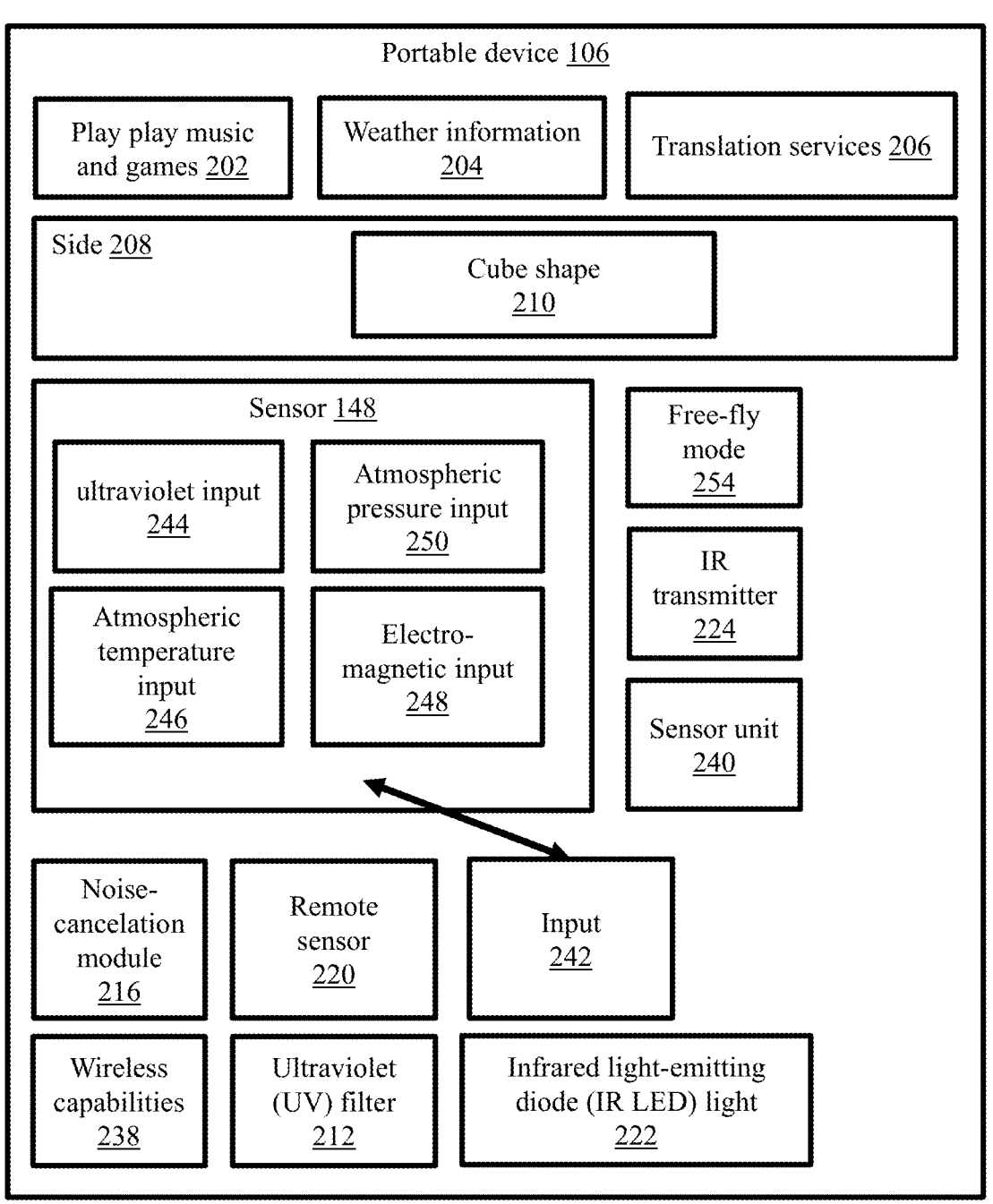
FIGS. 11A & 11B are block diagrams illustrating components of a portable device of a personal assistant system, according to an embodiment of the present disclosure.
Figure 11B:
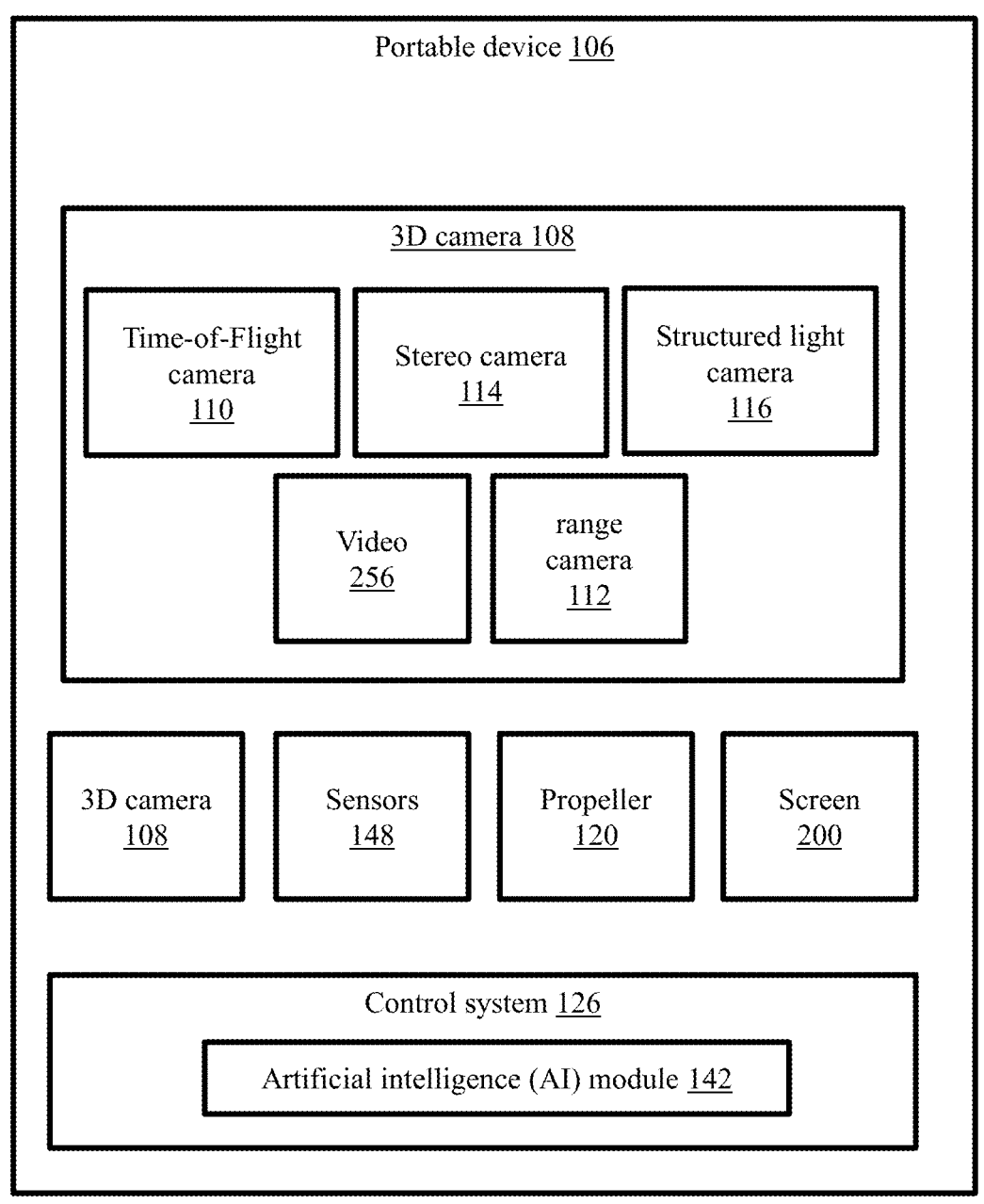
Figure 12:
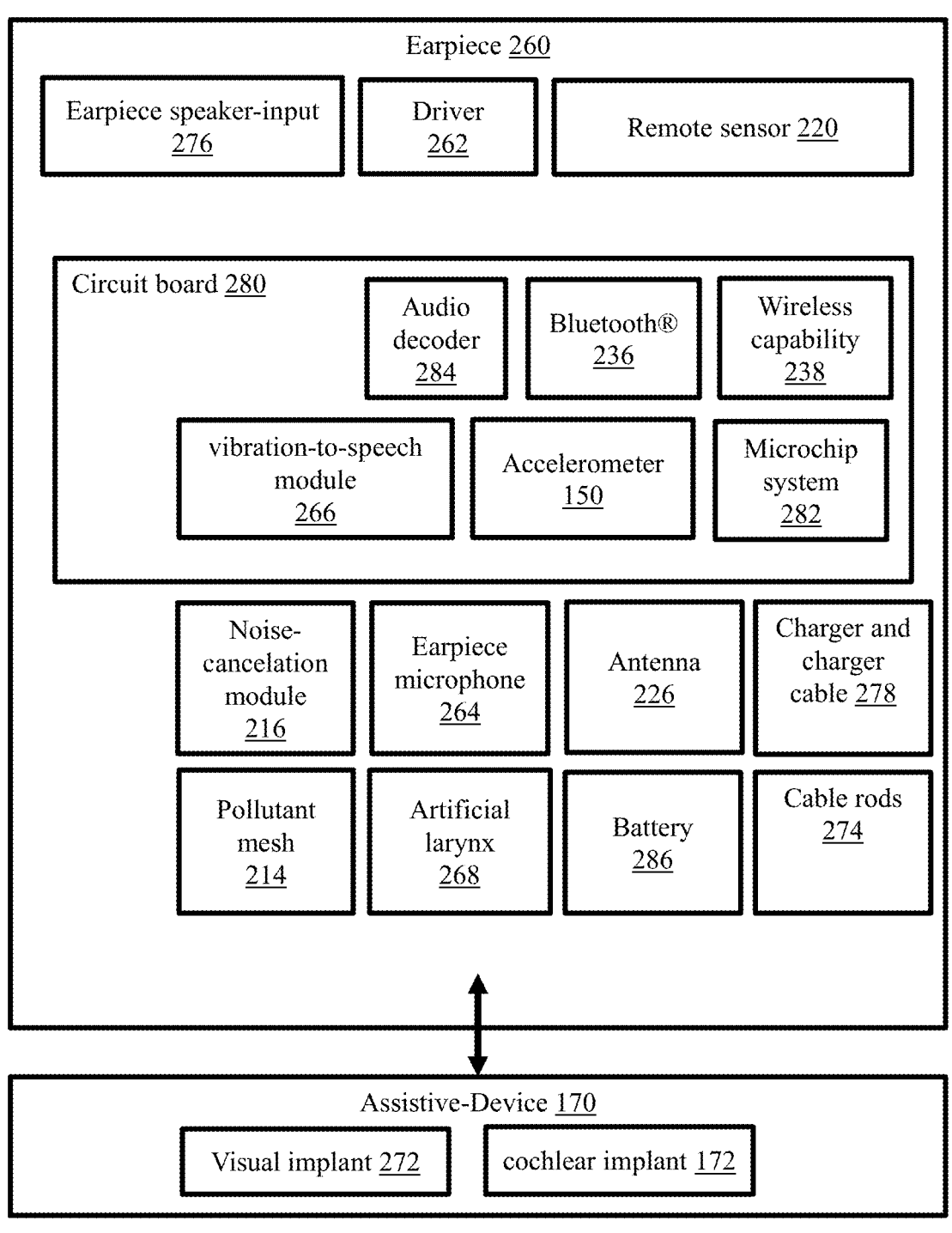
FIG. 12 is a block diagram illustrating components of an earpiece and an assistive-device of a personal assistant system, according to an embodiment of the present disclosure.

As shown in FIG. 9, the personal assistant system 100 may include an earpiece 260. The earpiece 260 may be in communication with the portable device 106, the speaker 122, and the microphone 124. The earpiece 260 may include a driver 262, an earpiece microphone 264, a noise-cancelation module 216, or a vibration-to-speech module 266. The earpiece 260 may also include an artificial larynx 268. The artificial larynx 268 may be configured to extend toward a neck area 270 of the user 102. The artificial larynx 268 may be configured to utilize the vibration-to-speech module 266 to allow the user 102 to communicate when vocally impaired. For example, the earpiece 260 may also be configured to connect to assistive devices 170, such as a cochlear implant 172, or visual implant 272. The earpiece 260 may also be configured to provide language translation 190 directly to the user 102. The earpiece 260 may also include an earpiece speaker-input 276. The earpiece 260 may include cable rods 274 to connect the earpiece microphone 264 to the driver 262 and the earpiece speaker-input 276. The earpiece 260 may be configured to be charged via a charger and charger cable 278. The earpiece 260 may also include a circuit board 280. The circuit board 280 may include an audio decoder 284, Bluetooth® 236, microchip system 282, and an accelerometer 150. It should be appreciated that the microchip system 282 and the driver 262 may allow for assistive devices 170 to connect to the earpiece 260 separate from the portable device 106. The earpiece 260 may also include a battery 286 for recharging. The earpiece 260 may also include pollutant mesh 214. The earpiece 260 may also include an antenna 226. The earpiece 260 may also include a remote sensor 220. One of ordinary skill in the art may select a suitable earpiece 260 to work in conjunction with the portable device 106 within the scope of the present disclosure. The portable device 106 may also be disposed on the earpiece 260. It should be appreciated that the portable device 106 may be coupled to the earpiece 260 to enhance portability of the portable device 106.

Figure 13:
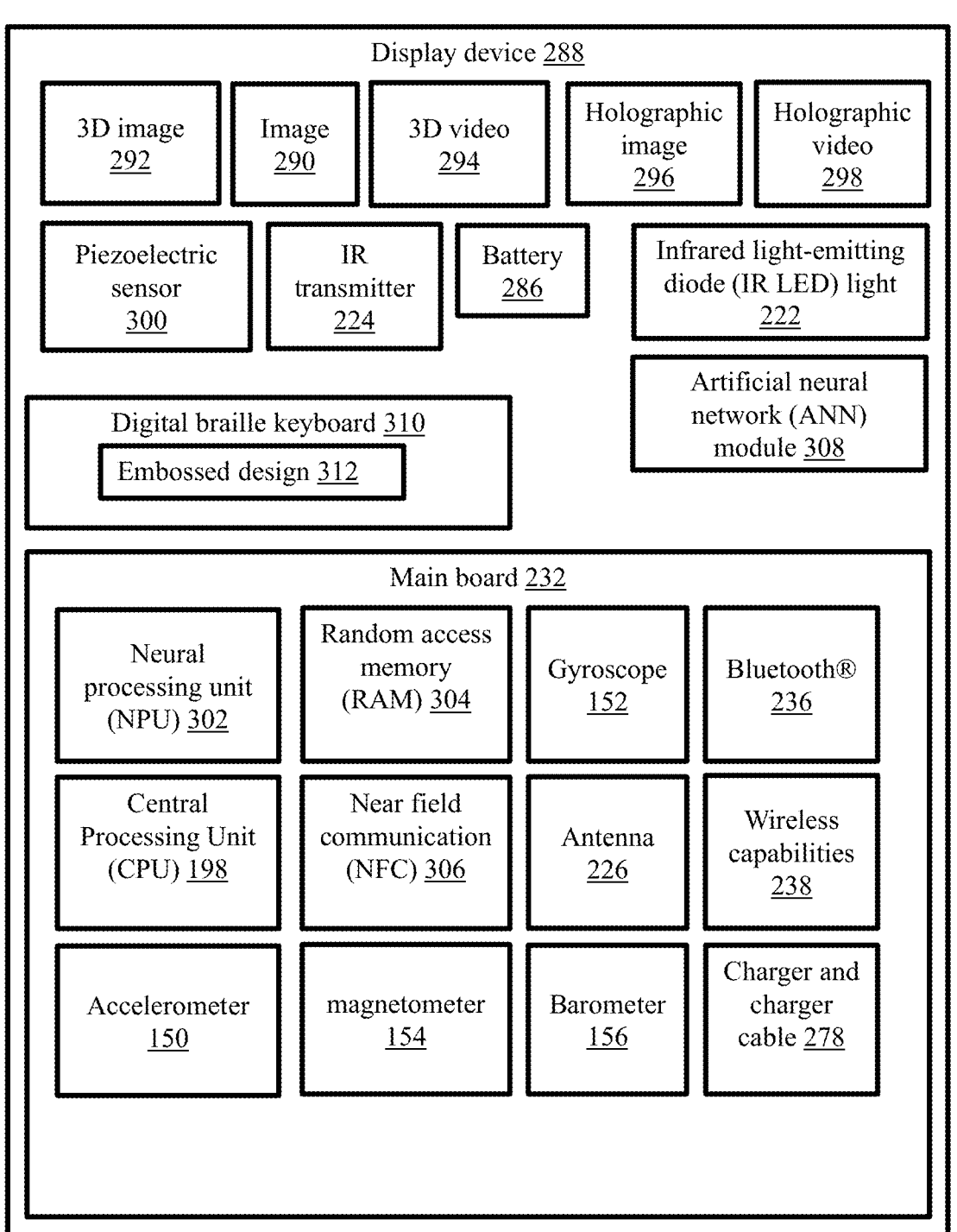
FIG. 13 is a block diagram illustrating components of a display device of a personal assistant system, according to an embodiment of the present disclosure.
Figure 14:
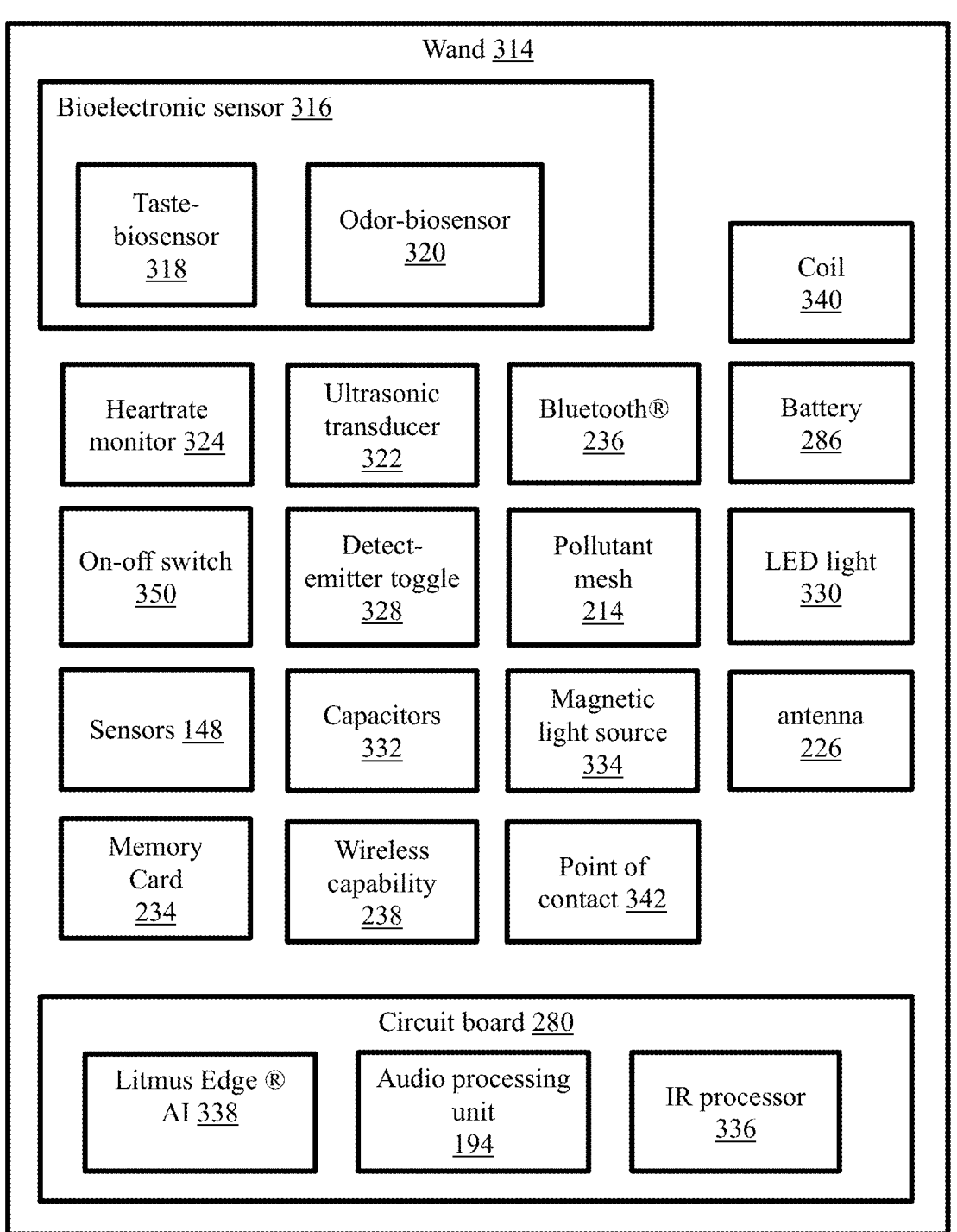
FIG. 14 is a block diagram illustrating components of a wand of a personal assistant system, according to an embodiment of the present disclosure.

As shown in FIG. 13, the personal assistant system 100 may include a display device 288. The display device 288 may be configured to generate an image 290, a 3D image 292, a video 256, a 3D video 294, a holographic image 296, or a holographic video 298. The display device 288 may include a piezoelectric sensor 300 for detecting changes in pressure, for example, the detect tactile signals from the user 102. The piezoelectric sensor 300 may be configured to detect pressure signals created by the user 102. The display device 288 may be configured to stretch or expand relative to the user's 102 preferences and mode of use. Specifically, the display device 288 may be configured to expand its frame in order to provide more space for visual content. The display device 288 may be durable, and allow for all-senses data exchange 104, for example, through descriptive function keys for all types of data sensed. The display device 288 may include a main board 232. The main board 232 may include a neural processing unit (NPU) 302 to assist with the AI module 142. The main board 232 may include a CPU 198. The main board 232 may include random access memory (RAM) 304. The main board 232 may include an antenna 226. The main board 232 may include near field communication (NFC) 306. The main board 232 may also include wireless capabilities 238 and Bluetooth® 236. The main board 232 may also include an accelerometer 150, a magnetometer 154, a gyroscope 152, and a barometer 156. The display device 288 may include a separate battery 286, configured to be charged with a charger and charger cable 278. The display device 288 may also include an IR LED light 222 and an IR transmitter 224 and may utilize OLED technology. The display device 288 may also include an artificial neural network (ANN) module 308. The display device 288 may also be configured to allow the user 102 to operate the display device 288 with the same functionalities as the user-device 158.

The display device 288 may further include a digital braille keyboard 310. The digital braille keyboard 310 may be programmed into the display device 288 for convenient deployment. For example, the digital braille keyboard 310 may be specifically designed for visually impaired users 102 to detect tactile signals from the user 102. The digital braille keyboard 310 may include an embossed design 312. The digital braille keyboard 310 may also be foldable, allowing the user 102 to fold the digital braille keyboard 310 outwardly from the display device 288 to use and to fold the digital braille keyboard 310 back into the portable device 106 when not in use. Advantageously, the personal assistant system 100 may be utilized for visually impaired users 102 through the digital braille keyboard 310 feature.

Turning now to FIGS. 6 through 8 and 14, the personal assistant system 100 may include a wand 314. The wand 314 may include a bioelectronic sensor 316. The bioelectronic sensor 316 may include a taste-biosensor 318. The bioelectronic sensor 316 may also include an odor-biosensor 320. For example, the odor-biosensor 320 may be an olfactometer for detecting and measuring odor dilution. The wand 314 may include an ultrasonic transducer 322. The ultrasonic transducer 322 may provide localized coverage, for example, to detect minor injuries of a user 102 such as fractures or sprains. The ultrasonic transducer 322 may transmit ultrasound and receive the reflections in order to display an image 290 on the display device 288. For example, the wand 314 may further include a heartrate monitor 324. The wand 314 may include an on-off switch 350 and a detect-emitter toggle 328. The wand 314 may also include an LED light 330 for visual assistance. The wand 314 may include sensors 148 and capacitors 332 disposed on the wand 314 for detecting when the user 102 is holding the wand 314 in the user 102's hand. The wand 314 may also include an IR source 352. The wand 314 may also include pollutant mesh 214 disposed on the wand 314 in close proximity to the bioelectronic sensor 316. The wand 314 may also include a magnetic light source 334. The wand 314 may also include a memory card 234 separate from the portable device 106 or the display device 288. The wand 314 may also include a circuit board 280. The circuit board 280 may include an IR processor 336, an audio processing unit 194, and artificial intelligence (AI) 338. The AI 338, for example, may provide insight on a user's 102 body fluids, eye pressure, and transfer information to doctors. The AI 338 may operate in conjunction with the bioelectronic sensor 316 to map and chemically analyze the composition of smells and tastes. The wand 314 may also include a battery 286 and coil 340. The wand 314 may also include wireless capabilities 238 and Bluetooth® 236. The wand 314 may include a point of contact 342 for the bioelectronic sensor 316 to achieve physical contact with the user 102 or an environment. The wand 314 may also include other sensors 148, for example, infrared sensors for thermal detection. It should be appreciated that the wand 314 may be configured to be waterproof, able to withstand chemical damage, shock absorbent, and able to withstand extreme temperatures and weather in order to be utilized in various environments in tandem with the portable device 106. It should be appreciated that the bioelectronic sensor 316 may enhance a user's 102 daily activities such as aiding the user 102 with safe handling of chemicals.

As shown in FIG. 15, a method 400 for operating a personal assistant system 100 that assists the user 102 is provided. The method 400 may include a step 402 of providing a personal assistant system 100. The personal assistant system 100 may include a portable device 106. The portable device 106 may include a 3D camera 108. The personal assistant system 100 may also include a control system 126. The control system 126 may include an audio recognition module 130. The portable device 106 may also include an image recognition module 134. The portable device 106 may also include a processor 138. The portable device 106 may also include an artificial intelligence (AI) module. The portable device 106 may also include an output generating module 146. The personal assistant system 100 may also include a microphone 124 and a speaker 122. The portable device 106 may also include a screen 200 disposed on the portable device 106. The personal assistant system 100 may include a display device 288, an earpiece 260, and a wand 314. The screen 200 may be in communication with the microphone 124, speaker 122, 3D camera 108, and the control system 126, the earpiece 260 in communication with the portable device 106, the speaker 122, and the microphone 124. The display device 288 may be configured to generate content including an image 290, a 3D image, a video 256, a 3D video, a holographic image, or a holographic video. The earpiece 260 may be in communication with the portable device 106, the speaker 122, and the microphone 124, and the wand 314. The wand 314 may include a bioelectronic sensor 316. The bioelectronic sensor 316 may include a taste-biosensor 318, or an odor-biosensor 320. The method 400 may include a step 404 of converting an audio received by the microphone 124 into a processor-executable audio format 132 via the audio recognition module 130. The method 400 may include a step 406 of converting an image 290 received by the 3D camera 108 into a processor-executable visual format 136 via the image recognition module 134. The method 400 may include a step 408 of transforming the processor-executable audio format 132 and the processor-executable visual format 136 into a processor-output 140 via a processor 138. The method 400 may include a step 410 of analyzing the processor-executable audio format 132 and the processor-executable visual format 136 via the AI module 142 for an actionable command 144. The method 400 may include a step 412 of transforming the processor-executable audio format 132 and the processor-executable visual format 136 via the AI module 142 into the processor-output 140 representative of the actionable command 144. The method 400 may further include a step 414 of converting the processor-output 140 via the output generating module 146 into an output 344 for the user 102. This method 400 allows a user 102 to receive real-time sensory feedback from the personal assistant system 100.

Advantageously, the personal assistant system 100 provides a unique experience for the user 102. The present technology may be particularly relevant to the fields of assistive technology, personal computing, and mobile communication devices. It addresses the needs of individuals with sensory impairments by providing a multi-functional device that can assist with communication, entertainment, navigation, and environmental awareness. The present technology also finds application in the management of personal and professional tasks, offering a holistic approach to life management. Additionally, the present technology has implications for the fields of virtual and augmented reality, as it involves the processing and projection of three-dimensional and holographic content. It also relates to the field of artificial intelligence, particularly the use of neural networks and fuzzy logic for the processing of complex sensory data and the provision of adaptive, personalized user 102 experiences.

The present technology's multifaceted sensory capabilities, including its ability to detect and emit a wide range of environmental and human sensory data, make it applicable to various industries such as healthcare, emergency services, education, entertainment, and personal security. The present technology's innovative input and output methods, including its digital braille keyboard 310 and display device 288, position it at the forefront of developments in human-computer interaction and wearable technology. In this way, improved support may be provided for individuals with varying sensory abilities, along with enhancement of life management capabilities for all users 102.

EXAMPLES

Example embodiments of the present technology are provided with reference to the several figures enclosed herewith.

Example 1—Information and Data Use of Personal Assistant System

When the personal assistant system is activated at unknown locations or premises, the personal assistant system will record the surroundings, the products, and the services that the user engages with, for example, when the user has an appointment at a newly opened salon, clinic, store etc. This allows the user to become familiarized with the new environment and keep a record of the visual and audible experiences that they may wish to review at a later date. This allows the user to be "in the moment" so that they may focus on important moments and life, while the personal assistant system tracks the event details. This can also include all-senses data exchange for investigation purposes of the event that took place, in the case of circumstances that may require legal recourse.

Example 2—Hands-Free Use of Personal Assistant System

The personal assistant system may be designed to provide a hands-free experience for users engaged in various activities. For instance, a user driving a vehicle can utilize the personal assistant system to receive navigational assistance without the need to physically interact with the device. The portable device can use its cameras to monitor the environment and provide real-time traffic updates. The user can issue voice commands to personal assistant system, which are picked up by the microphone, processed by the AI module, and actions are executed accordingly. This could include rerouting due to traffic conditions or reading out text messages, allowing the user to maintain focus on driving.

The personal assistant system may help pedestrians to prevent collisions, as the portable device may follow the pedestrian to monitor their location and detect oncoming traffic. As a bystander for accidents and other environmental hazards or disasters, the portable device may also serve as means of contacting local authorities in real-time, such as police, fire department, or emergency medical services.

In a home setting, the hands-free feature enhances convenience and safety while multitasking. A user cooking in the kitchen can ask the personal assistant system for recipe assistance or to set timers for various dishes. The portable device can display visual aids on its foldable screen, such as cooking instructions or timers, while the user continues to prepare the meal without interruption. If an unexpected situation arises, like a pot boiling over, the personal assistant system can alert the user and provide quick instructions on how to handle the situation, all without the user needing to touch the device. This may also allow the user to learn new skills, devices, or activities that would otherwise take a long time, especially for people with medical conditions.

The personal assistant system may be designed to provide business owners with business management planning and organization and assist individuals who require precise time-space management, and prioritizing necessities. The personal assistant system eliminates unnecessary or obstructive information by providing the most adequate fast and financially secured advice, and steps to complete the task in profitable way with maximum time saved and minimum third-party involvement. For example, during a business presentation, the presenter can control the flow of slides or access notes through simple voice commands or gestures. The portable device can project the presentation onto a surface, and the presenter can navigate through the content while freely engaging with the audience. This hands-free interaction ensures a smooth delivery and keeps the presenter's hands unoccupied, allowing for natural body language and a more impactful presentation.

Example 3—Earpiece Use of Personal Assistant System

The personal assistant system's Earpiece capabilities allow for seamless integration with various devices and implants. For example, a user with a cochlear implant can connect to personal assistant system via the earpiece, enabling clear and personalized audio communication. Personal assistant system can transmit audio from phone calls or music directly to the cochlear implant, providing an inclusive experience for individuals with hearing impairments. Additionally, the microphone can pick up the voice of the user and transmit it to the caller, facilitating a two-way conversation without the need for additional devices.

In a professional environment, the earpiece feature can be used to connect the personal assistant system to a conference room's audio system. During a meeting, participants can speak naturally, and their voices are captured by the personal assistant system's microphone and broadcast through the room's speakers. This ensures that everyone in the meeting can hear the discussion clearly, regardless of their position in the room. Furthermore, the personal assistant system can record the meeting and later transcribe the audio into text, providing accurate minutes that can be shared with attendees and those who could not be present.

For leisure activities, such as jogging or working out at the gym, the personal assistant system's earpiece connectivity allows users to listen to their favorite music or podcasts without the need to carry a smartphone or music player. The earpiece can deliver high-quality audio, and the user can control playback through voice commands, keeping their exercise routine uninterrupted and their focus on the activity at hand.

Example 4—Holographic Use of the Display Device

The holographic capabilities of the display device offer an immersive and interactive experience. In an educational setting, a teacher can use the personal assistant system to project three-dimensional holographic models that students can observe from all angles. For instance, a biology teacher can display a detailed hologram of the human heart, showing its structure and function. Students can walk around the hologram, view it from different perspectives, and even interact with it to see how blood flows through the chambers, enhancing their understanding of the subject matter.

In the retail industry, the holographic content on the display device can revolutionize the shopping experience. Customers can view holographic representations of products, such as electronics or furniture, to better visualize how the items would look in their own space. They can interact with the holograms to change colors, features, or configurations, making informed decisions before making a purchase. This technology can also be used for virtual try-ons, where customers can see how clothes or accessories would look on them without the need for physical fitting rooms.

For personal entertainment, the holographic content on the display device can be used to play games or watch movies in a three-dimensional format. Users can enjoy a more engaging gaming experience as characters and environments pop out of the screen, creating a sense of depth and realism. Movie enthusiasts can watch their favorite films with holographic effects, making the viewing experience more dynamic and captivating.

Example 5—Digital Braille Keyboard Use of the Display Device

The digital braille keyboard functionality of the display device may be designed to cater to users with varying needs, including those who are visually impaired. The embossed digital braille keyboard allows for tactile navigation and input, enabling users to type messages, emails, or commands without the need to see the keys. This feature may be particularly beneficial for individuals who rely on braille or other tactile methods for communication. The digital braille digital braille keyboard can also be programmed with customizable shortcuts to access frequently used functions or applications, streamlining the user's interaction with the personal assistant system.

In a professional context, the digital braille keyboard can be used to quickly input data or control the personal assistant system during presentations or meetings. Users can switch between applications, control the volume, or pause and play media with dedicated function keys, making multitasking more efficient. The digital braille keyboard's responsive design ensures that commands are executed promptly, keeping workflows smooth and uninterrupted.

For creative professionals, such as writers or programmers, the digital braille keyboard provides a comfortable and efficient typing experience. The tactile feedback from the embossed keys can reduce typing errors and increase speed, allowing for prolonged periods of focused work. The personal assistant system can also convert speech to text, offering an alternative method of content creation for those who prefer to dictate their thoughts.

Example 6—Page Scanning Use of the Personal Assistant System

The page scanning feature of the personal assistant system streamlines the process of digitizing documents. Users can activate the personal assistant system to scan multiple pages of a document without the need for a traditional scanner or printer. The portable device can hover over the document, capturing high-resolution images of each page, which are then processed and stored in the user's preferred digital format. This capability may be particularly useful for students, researchers, or professionals who need to quickly convert physical documents into editable or shareable digital files.

In a library setting, the page scanning function can be used to preserve historical documents. The personal assistant system can delicately scan fragile pages, minimizing physical contact and the risk of damage. The digitized documents can then be archived and made accessible to a wider audience, facilitating research and educational initiatives. The personal assistant system's AI module may also enhance the scanned images, improving readability and clarity.

For business professionals, the page scanning feature can be used during meetings or negotiations to quickly share physical documents with all participants. Contracts, reports, or handouts can be scanned and immediately projected onto a screen or shared digitally with attendees. This not only saves time but also ensures that everyone has access to the same information, promoting transparency and collaboration.

Example 7—Scent and Taste Detection with the Wand

The bioelectronic sensor may help a user detect and catalogue various smells, and tastes. The wand may be placed in an area that is hard to reach to detect odors. The wand may be positioned in an environment that the user may want to avoid due to hazardous pollutants in the air. This allows the user to determine if the odors are harmful, or if they need to contact health services for odors or chemical substances that would otherwise go unnoticed or unchecked.

The bioelectronic sensor may also serve as a general monitor for users in areas where smoke detectors, carbon monoxide detectors, and other monitoring devices are not present. The wand can alert the user to harmful gases and presence of particulates in the air, especially for users who have lost their sense of smell due to medical conditions.

Example 8—Injury Detection and Therapy with the Ultrasound

The ultrasonic transducer may provide a user with real-time injury detection and analysis, providing the user with localized ultrasound results of potential fractures and sprains. A user that is playing sports, or engaging in physical training or exercises may use the ultrasonic transducer to assist them in making judgment calls for continuing physical activities or ceasing any physical movement to seek medical attention.

The user may also benefit from the ultrasonic transducer to conduct therapeutic exercises, including muscle tension relief, and simulating tissue healing. The ultrasonic transducer may be used on the user's hands, shoulders, neck, or knees in order to combat inflammation and contractures. Utilizing the ultrasonic transducer for therapeutic purposes provides pain and tension relief to users with medical conditions such as sciatica, neuritis, tendinitis, muscle contractures, and scar tissue buildup.

Example 9—Utilizing the Screen for Video Chats While on the move

The user may engage in a phone call or video chat with a third-party via the screen on the portable device. The user may freely move around without the need to reposition the portable device. The portable device may follow the user and maintain a proximity in order to share the screen and provide audio for the user. The user may also use voice commands to start or end a phone call or video chat, allowing the user to focus on other tasks while talking with the third-party.

The portable device may also monitor the surroundings of the user while the user is engaged in a phone call or video chat and alert the user of changes in the environment. The portable device may also alert the user to other important events happening during the phone call or video chat, in order to aid the user in time management. This allows the user to decide whether to record or disregard the surrounding environment, reschedule events, or terminate the phone call or video chat.

Example embodiments are provided so that this disclosure will be thorough and will fully convey the scope to those who are skilled in the art. Numerous specific details are set forth such as examples of specific components, devices, and methods, to provide a thorough understanding of embodiments of the present technology. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What may be claimed is:

1. A personal assistant system for a user, comprising:
a portable device including:
    a three-dimensional (3D) camera configured to generate an image representative of 3D space; and
    a propulsion system configured to self-propel the portable device;
a speaker;
a microphone;
a wand including a bioelectronic sensor, the bioelectronic sensor including a member selected from a group consisting of a taste-biosensor, an odor-biosensor, and combinations thereof; and
a control system in communication with the portable device, the speaker, the microphone, and the wand, the control system including:
    a navigation module configured to control the propulsion system;
    an audio recognition module configured to convert audio received by the microphone into a processor-executable audio format;
    an image recognition module configured to convert the image received by the 3D camera into a processor-executable visual format;
    a processor configured to transform the processor-executable audio format and the processor-executable visual format into a processor-output;
    an artificial intelligence (AI) module configured to operate with the processor, analyze the processor-executable audio format and the processor-executable visual format for an actionable command, and transform the processor-executable audio format and the processor-executable visual format into the processor-output representative of the actionable command; and
    an output generating module configured to convert the processor-output into an output for the user.

2. The personal assistant system of claim 1, wherein the portable device further comprises a sensor configured receive an input from an environment, the input including a member selected from a group consisting of a force input, an optical input, an electromagnetic input, an ultraviolet input, an atmospheric temperature input, an atmospheric pressure input, and combinations thereof.

3. The personal assistant system of claim 1, wherein the portable device further comprises a screen disposed on the portable device, the screen in communication with the control system.

4. The personal assistant system of claim 3, wherein the screen is configured to protrude outward from the portable device when in use and retract back toward the portable device when not in use.

5. The personal assistant system of claim 1, wherein the 3D camera includes a member selected from a group consisting of a time-of-flight camera, a range camera, a stereo camera, a structured light camera, and combinations thereof.

6. The personal assistant system of claim 1, wherein the propulsion system includes a propeller.

7. The personal assistant system of claim 1, wherein the control system further comprises a sensor, the sensor including a member selected from a group consisting of an accelerometer, a gyroscope, a magnetometer, a barometer, and combinations thereof.

8. The personal assistant system of claim 1, further comprising an earpiece in communication with the portable device, the speaker, and the microphone, the earpiece including a member selected from the group consisting of a driver, an earpiece microphone, a noise-cancelation module, a vibration-to-speech module, and combinations thereof.

9. The personal assistant system of claim 8, wherein the earpiece further includes an artificial larynx configured to extend toward a neck area of the user.

10. The personal assistant system of claim 1, further comprising a display device configured to generate content including a member selected from a group consisting of an image, a 3D image, a video, a 3D video, a holographic image, a holographic video, and combinations thereof.

11. The personal assistant system of claim 10, wherein the display device includes a piezoelectric sensor configured to detect braille tactile signals created by the user.

12. The personal assistant system of claim 1, wherein the wand further includes an ultrasonic transducer.

13. The personal assistant system of claim 1, wherein the wand further includes a heartrate monitor.

14. The personal assistant system of claim 1, wherein the personal assistant system is configured to be in communication with a user-device including a member selected from a group consisting of a smartphone, a remote control, a desktop computer, a touch screen, a tablet, and combinations thereof.

15. The personal assistant system of claim 1, wherein the personal assistant system is configured to be in communication with an assistive device for sensory data exchange, the assistive device including a member selected from a group consisting of a cochlear implant, a brain-speech array, a speech generator, an eye tracker, an electronic mobility aid, and combinations thereof.

16. The personal assistant system of claim 1, wherein the personal assistant system is configured execute an activity of the user, the activity including a member selected from a group consisting of a calendar invite, an instance of a global positioning system (GPS) location, an instance of content recording, a media content, a language translation, an instance of a biometric analysis, and combinations thereof.

17. The personal assistant system of claim 1, wherein the portable device further comprises the speaker, the microphone, the control system, and a screen in communication with the control system.

18. The personal assistant system of claim 17, wherein the portable device further comprises a propeller and a sensor, the sensor configured receive an input from an environment, the input including a member selected from a group consisting of a force input, an optical input, an electromagnetic input, an ultraviolet input, an atmospheric temperature input, an atmospheric pressure input, and combinations thereof.

19. A method of using a personal assistant system for assisting a user, the method comprising:

providing a personal assistant system according to claim 1;

converting an audio received by the microphone into a processor-executable audio format via the audio recognition module;

converting an image received by the 3D camera into a processor-executable visual format via the image recognition module;

transforming the processor-executable audio format and the processor-executable visual format into a processor-output via a processor;

analyzing the processor-executable audio format and the processor-executable visual format via the AI module for an actionable command;

transforming the processor-executable audio format and the processor-executable visual format via the AI module into the processor-output representative of the actionable command; and converting the processor-output via the output generating module into an output for the user.

* * * * *